United States Patent [19]
Winton

[11] 3,796,414
[45] Mar. 12, 1974

[54] AERATOR
[75] Inventor: Benjamin A. Winton, Adell, Wis.
[73] Assignee: Fresh-Flo Corporation, Adell, Wis.
[22] Filed: July 19, 1973
[21] Appl. No.: 380,565

Related U.S. Application Data
[63] Continuation of Ser. No. 178,347, Sept. 7, 1971, abandoned.

[52] U.S. Cl.................. 261/29, 210/169, 210/197, 210/219, 261/84, 261/91
[51] Int. Cl............................................ B01f 3/04
[58] Field of Search............ 261/29, 87, 84, 30, 91, 261/93, 36; 210/67, 169, 219, 270, 197

[56]  References Cited
UNITED STATES PATENTS

| | | | |
|---|---|---|---|
| 2,165,889 | 7/1939 | Fisher et al. | 261/91 X |
| 2,174,147 | 9/1939 | Unger | 261/30 X |
| 2,641,455 | 6/1953 | Poirot | 261/29 |
| 2,802,647 | 8/1957 | Bolton | 261/84 X |
| 3,053,390 | 9/1962 | Wood | 261/93 X |
| 3,086,715 | 4/1963 | Mineau et al. | 261/87 UX |
| 3,333,834 | 8/1967 | Brewster | 261/49 |
| 3,497,185 | 2/1970 | Dively | 261/36 |
| 2,601,519 | 6/1952 | Hardy et al. | 261/29 |

Primary Examiner—Frank W. Lutter
Assistant Examiner—Vincent Gifford
Attorney, Agent, or Firm—Michael, Best & Friedrich

[57] ABSTRACT

An aerator which has a housing with a lower propeller means to draw in liquid and force it upward in the housing. There may be an upper propeller in the housing which draws air in and forces it downwardly to meet the upward flow of liquid. Another propeller having blades for producing radial flow causes the liquid or the liquid and air mixture to be thrown outwardly through an opening in the wall of such housing.

2 Claims, 3 Drawing Figures

PATENTED MAR 12 1974

3,796,414

Inventor
Benjamin A. Winton
By
Gerrit V. Foster
Attorney

AERATOR

This is a continuation of application Ser. No. 178,347, filed Sept. 7, 1971 and now abandoned.

BACKGROUND OF THE INVENTION

1. Field of the Invention.

This invention relates to an aerator designed to positively force fluid or a mixture of air and fluid radially out of a housing. The purpose is to efficiently aerate liquid for its purification or to supply proper amounts of fresh oxygen to the liquid in which the aerator is partially immersed to maintain animal life therein.

2. Description of the Prior Art.

A water aerator which lifts water up through a housing and discharges it radially from elongated slots in the housing is shown and described in U.S. Pat. No. to P. J. Mineau et al, 3,086,715; other U.S. patents showing and describing water aerators as distinct from humidifiers, sprayers, gas washers, and air conditioning devices are U.S. Pat. Nos.: 2,641,455 3,333,834 3,497,185.

In the Mineau et al, patent the aerating action, while satisfactory, will not produce an efficient volume of liquid flow or the highly efficient results of this invention because there is no propeller having axially extending blades to positively thrust the liquid radially outward and there is no air fan bringing air down to meet the upflowing liquid. Also in U.S. Pats. Nos. 2,641,455 and 3,333,834 there is no propeller with axially extending blades to positively thrust liquid radially outward. In these patents air is drawn downwardly but does not meet upwardly flowing water. U.S. Pat. No. 3,497,185 describes a floating aerating device with a submerged motor. The so-called axially extending blades do not revolve to provide a radial thrust to the water which flows upwardly under the action of a propeller. Thus there is no teaching in any of the prior art, uncovered in a patentability search conducted by attorneys for applicant, of the unique action produced: (1) by a propeller with axially extending blades; or (2) by the downwardly flowing air meeting upwardly flowing liquid in the area where a radially flow forcing propeller is located.

BRIEF DESCRIPTION OF THE DRAWING

Figure 1:
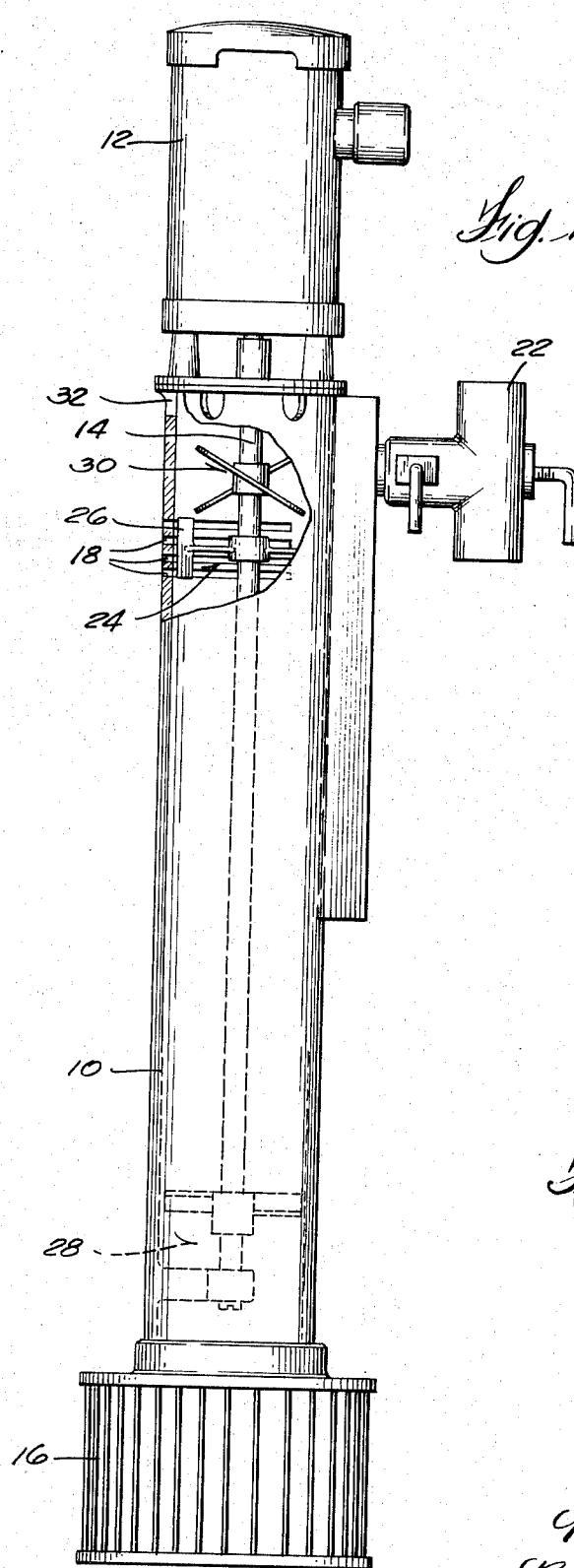
Figure 2:
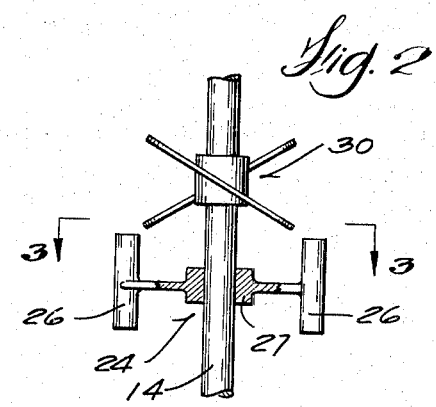
Figure 3:
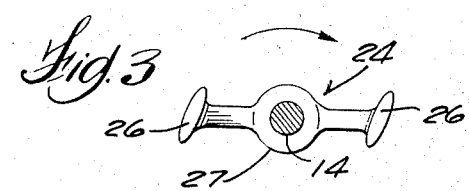

IN THE DRAWINGS:

FIG. 1 is a view in side elevation of an electric powered water aerator embodying the present invention, part of the housing being broken away to show the relative positioning of the downward flow air fan and the outward radial thrust propeller;

FIG. 2 is an enlarged fragmentary view in elevation of the air fan and outward radial thrust propeller incorporated in the water aerator of FIG. 1; and FIG. 3 is a sectional view taken on line 3—3 of FIG. 2.

DESCRIPTION OF THE PREFERRED EMBODIMENT

Referring to the drawing by reference numerals, there is illustrated for the purpose of describing this invention an electric motor driven water aerator. While other liquids than water may be aerated or purified a water aerator has been selected for illustrating this invention. The design of this aerator causes upwardly flowing water to be forced radially outward by a propeller having axially extending blades. It also contemplates, in some conditions or sizes of aerators, the incorporation of an air fan to force air downwardly to meet with the upwardly flowing water in the area where the radial outwardly thrust propeller or the like operates. The general mechanical elements of this water aerator are shown and described in the Mineau et al, U.S. Pat. No. 3,086,715. These elements include a housing 10, which may be of cylindrical or tubular cross-section. An electrical driving motor 12 is mounted on the top of the housing as shown. This motor drives an axially downwardly extending shaft 14 which is properly mounted in bearings within the housing 10. At its lower end the housing is provided with an intake and screen 16 of customary design. Near its upper end the housing is provided with a plurality of circumferentially extending axially spaced slots 18. A mounting bracket 22 is provided so that the aerator may be suspended in a body of liquid with the inlet below the surface and the slots 18 and motor 12 above the surface of the liquid. These mechanical elements are shown and their function described herein to provide a background for the novel and unique features of this invention.

The unique feature of this invention is the outward radial thrust propeller 24 with its axially or vertically extending blades 26 carried by a collar 27. These blades are spaced radially outward from such collar so that there is space between the collar and the blades for the axial passage of water. The blades are radially opposite the slots 18 and are pitched with respect to their circumferential path of rotation as shown in FIG. 3 so that when the propeller 24 is rotated by the shaft 14 to which it is attached in the direction shown, water brought into the interior of such propeller will be positively forced radially outward by the force of such propeller. The axial length of the blades 26 is substantially equal to the distance between the upper edge of the top slot 18 and the lower edge of the bottom slot 18. While four such slots and two such blades are shown for the purpose of illustration there can be more or less slots and more blades so long as the blades are dynamically balanced.

The use of the propeller 24 with its axially extending blades 26 radially spaced from the supporting collar 27 provides an axially extending interior which permits the upward axial movement of water or other liquid into the span of action of the blades 26. These blades will bite into such liquid and force it outwardly in a much greater volume than heretofore accomplished. Under some application conditions and in some sizes of aerators water being moved upwardly by the customary lower propeller 28, indicated by the broken lines of FIG. 1, will come in contact in the interior of the propeller 24 with air being forced downwardly by an air fan 30 located on the shaft 14 above the top slot 18. Such fan will draw air into the housing 10 through openings 32 located above the fan 30 and above the surface of the liquid in which the aerator is positioned and force it downward to meet and mix with the upwardly flowing liquid in the interior of and general area of the propeller 24.

This special arrangement of downward traveling air meeting upwardly traveling water or other liquid and mixing so that such mixture is acted upon by such positive action outward radial thrust propeller increases not only the amount of oxygen admixed with or absorbed in a cubic foot of water or liquid but also increases the amount of cubic feet per minute of aerated water or liquid ejected from the housing 10, all without any proportionate increases in the size and horsepower of the motor 12 over that now used in the various sizes made in accordance with the teachings of the Mineau et al, patent. In other words, the same horsepower motor (energy input) can be used with this invention to produce a greater concentration of oxygen contained in the water or liquid and a greater volume of flow per minute than the same motor could produce when used with the prior art aerators.

I claim:

1. An aerator adapted for mounting partly within and partly without a body of liquid comprising:
   a. a housing having an intake for liquid at its lower end, and an outlet for liquid near its upper end positioned above a body of liquid, said outlet comprising a plurality of circumferentially extending axially spaced slots;
   b. a motor mounted on the upper end of said housing;
   c. a shaft rotatably mounted within said housing, extending axially thereof, and connected to and driven by said motor;
   d. lower propeller means on said shaft in said housing to draw liquid in through said intake and force flow the same upwardly within said housing; and
   e. an outward radial thrust propeller on said shaft in said housing having a collar attached to said shaft, axially extending blades attached to said collar and radially spaced outwardly from said collar to provide space between said collar and the radially inner edges of said blades for the axial passage therebetween of upwardly flowing liquid, said propeller being positioned radially opposite said outlet to force the upwardly flowing liquid radially out through said outlet into the atmosphere above a body of liquid, the axial length of said blades being substantially equal to the distance between the upper edge of the top one of said slots and the lower edge of the bottom one of said slots.

2. An aerator adapted for mounting partly within and partly without a body of liquid comprising:
   a. a housing having an intake for liquid at its lower end, and an outlet for air and liquid near its upper end positioned above a body of liquid;
   b. a motor mounted on the upper end of said housing;
   c. a shaft rotatably mounted within said housing, extending axially thereof, and connected to and driven by said motor;
   d. lower propeller means on said shaft in said housing to draw liquid in through said intake and force flow the same upwardly within said housing;
   e. upper air fan means in said housing on said shaft above said outlet to force air downwardly in said housing to meet the upward flow of liquid at said outlet; and
   f. an outward radial thrust propeller on said shaft in said housing having a collar attached to said shaft, vertically extending blades attached to said collar and radially spaced outwardly from said collar to provide space between said collar and said blades for axial passage therebetween of upwardly flowing liquid, said propeller being positioned radially opposite said outlet to force the upwardly flowing liquid admixed with the downwardly flowing air radially out through said outlet into the atmosphere above a body of liquid.

* * * * *